Patented Sept. 19, 1933

1,927,086

UNITED STATES PATENT OFFICE 1,927,086

WOOD ARTICLE

Carleton Ellis, Montclair, N. J., assignor to Ellis-Foster Company, a corporation of New Jersey No Drawing. Application March 13, 1926
Serial No. 94,596

1 Claim. (Cl. 91—68)

This invention relates to articles made of wood, surfaced with lacquer coatings and particularly such as coatings containing nitrocellulose and a synthetic resin or resins as essential constituents and to processes of making the same, and relates especially to wood articles such as furniture and fabricated woodwork having one or more surfaces coated with compositions of the character hereinafter specified.

The problem of providing a properly lacquered finish on wood articles is essentially distinct from that involved in treating metal surfaces. This is due primarily to the fact that a wood surface is fairly porous as compared with a metal surface so that there is a tendency for the coating composition to sink into the pores of the wood. It is also essential that a wood lacquer should not "print", that is the finish should not show any markings from paper and twine wrapping used in the shipping of the furniture, for example. The problem of wood finishing lacquer compositions is also quite different from that involved in treating metal surfaces because of the great volume changes taking place in wood, due to absorption and elimination of water during different weathering periods and coatings must therefore be extremely elastic. This is especially important when wood finishes for exterior use are considered. Wood finishes for furniture and interior woodwork need not be as elastic as for exterior use, but should be relatively more elastic than most metal lacquers and enamels. Wood lacquers for furniture and interior woodwork should be possessed of great hardness and toughness and enough elasticity to stand such expansion and contraction as will be found necessary.

One of the objects of the present invention is to provide a coated wood article made from relatively cheap and available materials but having a high degree of durability.

Other and further objects and advantages will appear from the more detailed description set forth below, which description is given by way of example and not as limiting.

The exterior finish of such wood articles requires a certain degree of hardness coupled with toughness and elasticity. Furthermore the coating must adhere tenaciously even when the article is handled roughly. A marked degree of resistance to light and moisture and weather conditions is advantageous.

Nitrocellulose coatings of themselves often do not adhere well to wood, especially when the coated surface is kept wet for some time. The nitrocellulose film has a tendency to strip and peel.

In the present invention this tendency is minimized by the employment with nitrocellulose of a synthetic resin compatible therewith. The synthetic resin increases the adherence of the nitrocellulose film for the wood surface beyond that which is possessed by a nitrocellulose coating alone. In addition thereto, the synthetic resin acts not only as an agent to confer such greater adherence but also increases the total binder solids, thereby giving greater substance, and fills the porous surface, thus producing a more effective finish. The surface finish, whether intentionally dull or lustrous, should have a quality of smoothness which results only when sufficient binding agent is present to cement or bind together any particles of pigment used therein.

There are very definite limits to the solubility of nitrocellulose. The same is true of the natural resins. Furthermore some of the natural gums or resins are by no means compatible with nitrocellulose. Only a restricted number of the natural resins are appropriate for compounding with nitrocellulose and the supply of these natural resins is limited or the market prices thereon are subject to considerable fluctuation which is disadvantageous from a manufacturing standpoint. On the other hand there are a number of synthetic resins, which, according to the present invention, may be used without the restrictions or disturbances imposed in using the natural resins, which is a condition of affairs highly advantageous. Furthermore the cost of manufacture of such synthetic resins generally speaking is not subject to great variation due to violent fluctuations in the cost of raw materials.

By the term "synthetic resin" I mean a resinous product derived primarily from non-resinous raw materials by a synthetic means, and not such products as, for example, rosin ester, or "ester gum" which is produced by simple esterification of a natural resin. (See Ellis, "Synthetic Resins and Their Plastics", New York, 1923, page 13). On the other hand rosin phthalic glyceride resin would be included by the term "synthetic resin" because the body contains an essential synthetic resinous constituent.

The following paragraphs denoted by numerals indicate some of the considerations, conditions and requirements involved in connection with the present invention.

1. *Consistency of the coating composition.—* The consistency for application should be such that the composition can be applied by means of a brush or a spraying device. If applied by the former method the composition should dry slowly enough to not show brush marks. It should work freely under the brush. This depends in part on the proportion of solvents and their degree of volatility. A quicker drying medium may be used for application by spraying.

2. *Quick drying.*—In any event the quality of quick-drying generally is very important as this feature allows several coats to be applied in a day. With a quick-drying material articles may be moved through the paint department rapidly and less space therefore is required for the operation.

3. *Sand papering.*—The surface should be capable of being sand papered soon after application, without gumming of the sand paper.

4. *Avoidance of precipitation.*—There should be no precipitation during drying due to a change in the proportion of solvent by differences in the rate of evaporation. The solvent employed is usually composite and the components thereof should be selected and adjusted to prevent any precipitation or coagulation during the drying period.

5. *Water elimination.*—In the preferred form of coating material water should not be present. This may be secured by care in the selection of the raw materials and especially by the use of anhydrous solvents. If water is present a high boiling solvent or water-eliminant preferably is added. This solvent should exert its solvent effect not only on the nitrocellulose but also on the synthetic resin during the stage of drying when water is being expelled.

6. *Total solids.*—The coating composition preferably should have a high content of total solids, preferably 30 per cent or more, in order that each application of a coat will leave on drying a substantial film. Since solvents or thinners represent a loss as they are used only to render the composition liquid for application the percentage of solvents or thinners should be kept as low as possible consistent with ease of application. Expensive solvents in general are not feasible as the cost of manufacture should be kept low.

7. *Pigments.*—There is a direct connection or co-operative effect existing between pigment and binder. Films of nitrocellulose with synthetic resins suitably incorporated with pigment are more durable and resistant than the unextended film. The pigment should be compatible with nitrocellulose and not be of an acid character such as would tend to impair the stability of the nitrocellulose to an objectionable degree. If stabilizers of a basic character are used in the nitrocellulose the pigment should not have any action on these. Also the pigment should not produce any thickening or livering effects with the synthetic resin employed.

Various pigments may be employed according to the color and nature of surface desired, zinc oxide, lithopone, titanox (titanium oxide pigment) are most suitable for white pigments, and as a base for light colors, color pigments of very fine texture and maximum light resistance being employed for tinting. Prussian blue, spectra black, lead chromate and cadmium sulphide yellows, para and toluidine red toners are most generally used for this purpose. Various other colors are used, and while, in some cases, inert pigments of low opacity are used, in most cases these pigments are omitted where highest gloss and covering power are desired. The use of such inert and mineral pigments as barytes, blanc fixe, silex and asbestine is most advantageous in the production of priming and dull or flat finishes. It is in all cases important to have the pigment well ground, and while this can be accomplished in several ways, the best results are obtained by grinding the pigment with the softeners or plasticizers separately subsequently blending with the other ingredients. In some cases the pigments may be ground in high boiling solvents, resin solutions, or a nitrocellulose soluton.

Pigments for interior lacquer enamels are used mainly for their color and decorative value, but where coatings are to be applied on exterior surfaces, the pigment also serves the purpose of exerting a protective action on the nitrocellulose from the destructive influence of the ultraviolet or actinic light.

The life of a nitrocellulose coating is much shorter when pigment is not present as light strikes through and apparently causes disintegration. Coatings rendered opaque by pigment have a much longer life. The pigment should, however, be small in amount when a gloss finish is desired. For this reason strong color such as Prussian blue and various lakes are used to give an intense coloration with a minimum amount of pigment. In this connection the physical condition of the pigment is important and it is desirable to grind the pigment to a point where it is practically peptized. Such finely ground material substantially eliminates trouble due to separation or flocculation of the pigment on standing.

8. *Synthetic resin.*—This material must be compatible or blend adequately with nitrocellulose, as the composition dries the resin should "colloid" well with the nitrocellulose. Furthermore the resin should be soluble in solvents appropriate for nitrocellulose including any high boiling solvents used as water eliminants, which solvents are generally last to leave the coating. Even though the solid constituents blend in the original solution separation may occur as the solvents evaporate due to changing composition. This should not occur and the ratio of one solvent to another in evaporation of a composite solvent preferably should be such as will at all times accommodate and promote a colloidal blend of the nitrocellulose and synthetic resin.

If nitrocellulose is incorporated with an incompatible resin in a suitable solvent mixture the liquid especially if very viscous may dry without segregation. In the solid film which forms the incompatible constituents will however be in a state of tension or stress and aggregation, yielding a brittle product, and deterioration will result on standing especially under the action of light and moisture. Resins thus vary considerably in their compatibility for nitrocellulose, and in general, those synthetic resins having, like camphor, a slight affinity or solvent action for nitrocellulose are preferable.

In some cases synthetic resins have been found to exert noticeable protective action on the nitrocellulose from the destructive influence of ultra-violet light, this being an important advantage over resins of the natural or fossil type. It should also be noticed that other organic compounds of a non-resinous nature, such as R salt (beta naphthol 3.6 disodium disulphonate) and various amines may be used as ultraviolet absorbing agents.

Nitrocellulose, pyroxylin, soluble cotton, celluloid, and other similar material exert a toughening action on the synthetic resin. The addition of 10 to 20% of such nitrocellulose compounds greatly improve the toughness of the resin and still larger quantities may be used when additional toughness is desired. For example amounts of nitrocellulose as high as 40 to 50% of the composition serve to increase the filming properties and the toughness of the resulting film.

In referring to compatible resins in this application, the condition of compatibility may be ascribed to a state of solid solution, that is the nitrocellulose and the synthetic resin dissolve in one another or are so intimately mixed that a clear, transparent, tough solid results. With an incompatible resin, a turbid, opaque, irregular or weak (one under internal stress) film is obtained, and this condition presents itself at the point where most of the solvent is evaporated. Such solid solution may form in the first instance when using resin which is not compatible with nitrocellulose but on standing or through any known causes, this may occur due to separation or expulsion of one compound from the immediate zone of the other with resultant substantial deterioration.

9. *Proportion of resin.*—If a small proportion of synthetic resin with respect to nitrocellulose is used, the character of the resin may be quite soft. Its effect on the nitrocellulose will be to render the latter more flexible. In other words it acts as a softening agent. Nitrocellulose will, however, take up or assimilate only a moderate amount of such soft material without detriment to its other properties. A high proportion of soft resin has too great a softening effect and harder resins should be employed when desired to correct this condition. The proportion of soft resin used should not be so high as to yield a lacquer which will "print", that is, the lacquer should not show paper or twine markings from wrappings of such materials used during shipment of furniture, for example. As a general rule, the hardness of the resin preferably should increase with the proportion employed. In some cases a soft resin may be used for softening purposes, coupled with hard resin as an extending binder in order to secure the desired physical properties. In the present invention I preferably employ the synthetic resin in considerable proportions; for example in an amount at least equal to the nitrocellulose and in some cases in the ratio of up to 4 parts of synthetic resin to one part of nitrocellulose.

10. *Color of the synthetic resin.*—This depends on the color of the coating material desired. White or colorless synthetic resins should be used for very light colored coatings, while red, brown, or black synthetic resins may be used for darker colored coatings.

11. *Solubility.*—As noted the synthetic resin should be soluble in solvents appropriate for nitrocellulose and should stand dilution well with the usual lacquer diluents. In general, it is desirable to have the resin soluble in acetone and the higher ketones, ethyl, butyl and amyl acetates, or mixtures of these esters with their corresponding alcohols, isopropyl and butyl, propionate, diethyl carbonate and similar solvents. Such solution should stand dilution well with benzol, chlorbenzol, toluol and xylol. In some special cases it is most desirable to have the synthetic resin soluble in alcohols or in hydrocarbons, but in substantially all cases, it is very important that the resin be insoluble in water and relatively resistant to the action of water.

12. *Stability of resin on exposure.*—Preferably the synthetic resin should show good resistance to weathering influences. It appears however that the synthetic resin and nitrocellulose may supplement each other so that when mixed the durability of the resulting coating is greater than that of either employed singly. For inside application, for example on furniture, the coating may of course be less durable.

13. *Livering.*—The synthetic resin should not possess an acid nature when used with basic pigments such as zinc oxide or white lead and react with these pigments to cause objectionable thickening so that the coating becomes difficult to apply, nor should the acidity be such as to affect the stability or durability of the nitrocellulose, nor to cause any other objectionable effects. Synthetic resins of low acid number are particularly necessary, and in general, acid numbers of less than twelve, are mostly desirable. Of course, much will depend upon the nature of the free acid present in the resin. Free mineral acids, corrosive salts and some of the comparatively strong organic acids are particularly objectionable and should be substantially eliminated. These acids have been found to be extremely detrimental to nitrocellulose coatings. An antacid should be present when chlorinated compounds which may liberate hydrochloric acid are used.

14. *Nitrocellulose.*—The toughness and strength of nitrocellulose are desired in the coating in a pre-eminent way therefore the maximum amount of nitrocellulose which can be incorporated without making a solution so viscous that it cannot be readily applied should be an objective. A low-viscosity nitrocellulose preferably is used, in order to secure the maximum proportion of this substance consistent with ease of application. Nitrocellulose such as gun cotton and the like forming highly viscous solutions therefore are not as desirable. Ordinary nitrocellulose of the type known as soluble cotton may be used. Cotton which has been exposed to heat at a temperature above 100° C. and having thereby a greatly diminished viscosity is especially useful. The cheapest stock for making the coating probably is celluloid scrap. Moving picture film or other white scrap may be used for light coatings, and tortoise shell comb cuttings and dust and the like used for darker colors. Celluloid scrap may be rendered low in viscosity by heating to 120–130° C. in a solution of calcium chloride for an hour or two; or by dry heating at between 100 and 130° C. Since the use of low-viscosity nitrocellulose or celluloid forms a feature of the preferred embodiment of the present invention further details will be hereinafter given.

15. *Stabilizers.*—Urea and its derivatives, amines, magnesium lactate and the like may be used as stabilizers. Zinc oxide, whiting and other masic pigments act as stabilizers. Celluloid ordinarily contains a stabilizer.

16. *Dehydration.*—Soluble cotton containing 5 per cent or so of water may be dried before use. A bone-dry product reduces the amount of relatively costly water-eliminants.

17. *Plasticizers and softeners.*—There are two classes of materials which are used to modify the properties of nitrocellulose film. Nitrocellulose alone, will, when dissolved in suitable solvents and applied to various surfaces, produce a clear and transparent film. Such films, however, are entirely too brittle for most purposes and must be rendered more flexible. In order to accomplish this, two classes of materials may be used, that is, softeners or plasticizers. Such materials as castor oil, nitrated castor oil, rape oil, boiled and blown oils and other such materials are generally known as softeners and are characterized by the fact that they may be incorporated with nitrocellulose to form a clear transparent film, but do not have any appreciable solvent action on the nitrocellulose.

On the other hand such materials as diethyl and dibutyl phthalate, dibutyl tartrate, triphenyl and tricresyl phosphates are better known as plasticizers, and differ slightly from the softeners in that they seem to have a more definite solvent action for nitrocellulose. It is sometimes hard to draw the line of division between softeners and plasticizers, but in some cases, for best results a certain amount of plasticizer should be used, but in many cases the most suitable film has been obtained by using about equal amounts of a true plasticizer and a softener. Certain synthetic resins of a soft nature may act either as plasticizers or softeners according to their solvent action on nitrocellulose.

In some cases the synthetic resin itself may act as a softening or plasticizing agent, and may be used to replace part or all of the usual type of softening or plasticizing agents. Thus resinous softeners often serve a useful function, since they render the coating more adherent to the surface treated and at the same time soften or render flexible the nitrocellulose. Moreover, it is usually possible to incorporate considerably more of these resinous softeners in a lacquer than can be successfully incorporated when an ordinary liquid or non-resinous softener is employed. This results in considerable economy and helps to produce a lacquer of greater solid content.

18. *Natural resins.*—Natural resins such as dammar or shellac, congo, copal and the like when desired, may be added. A proportion in excess of the amount of synthetic resin simultaneously employed is not usually desirable. Natural resins are too inflexible in their physical properties to be readily adjustable to meet the conditions of the present invention and their use is preferably confined to the status of moderate additions.

19. *Miscellaneous ingredients.*—Other substances which may be used to a greater or less degree include cellulose acetate, cellulose ethers and the like. Also fire retardants may be added including vavious chlorinated solids and appropriate mineral salts. When the coating is to be used on wooden surfaces the inflammability preferably is reduced to the lowest point practicable.

20. *Solvents and diluents.*—As stated, these are usually composite and a typical one consists of two or more components. These types commonly in use are as follows.

First, a low boiling liquid which is a good solvent for nitrocellulose, second, a medium boiling liquid, which is a good solvent for nitrocellulose, third, a high boiling liquid which is a good solvent for nitrocellulose, fourth a liquid blending agent, fifth, a non-solvent for nitrocellulose, used as a diluent or extending agent.

Under the first group are included such solvents as acetone, methyl ethyl ketone, methyl and ethyl acetates, various ethers and ethyl formate. Methyl and ethyl alcohols are not good solvents for the usual form of nitrocellulose, but are solvents for a certain type of nitrocellulose generally known as alcohol soluble cotton, and could for such use be classed in this division.

Under the second group are included butyl and amyl acetate, diethyl and ethyl butyl carbonates, and certain light acetone oils, mesityl oxide, ethyl and isopropyl propionates.

Under the third group are included such solvents as butyl propionate, furfural, ethyl lactate, ethylene glycol diacetate, diacetone alcohol, ethyl acetoacetate and similar solvents.

Under the fourth group are included the various alcohols, such as ethyl, isopropyl, butyl, amyl and benzyl alcohols, cyclohexanol (hexalin) pine oil and terpineol. This group, while not in most cases true solvents, act as blending agents and water eliminants and serve a useful function. They may act as true solvents in certain cases, such as when an alcohol soluble form of nitrocellulose is employed.

Under the last group are included benzol, chlorbenzol, toluol, solvent naphtha, xylol, turpentine, low boiling petroleum hydrocarbons and chlorinated paraffin or olefin hydrocarbons, which in no case are solvents, merely acting as extending or cheapening agents. Sometimes solvents of this last group are entirely omitted for various reasons such as modification of viscosity or on account of the nature of resin used, but most lacquers are made with the use of some of this class of liquid.

The exact solvent mixture to be employed in any given case will depend upon a number of factors, such as, cost, required drying time, odor, method of application (flowing, dipping, brushing, or spraying), type of nitrocellulose used, type of synthetic resin used, nature of finish desired, atmospheric or moisture conditions, etc., and it is therefore impracticable to give any absolute formulæ for such and it will be understood that for any given proportions of solids many other solvent combinations may be used.

In general it may be said that the solvent mixture must be so constituted that the nitrocellulose solvent is sufficiently high boiling and present in such amounts as will prevent any precipitation or separation of the nitrocellulose from the film during evaporation of the solvents, and it is for this reason that the synthetic resin also must be freely soluble in the same solvent as with the nitrocellulose. For some types of work the low boiling solvents have been successful, but in most cases the use of medium boiling or high boiling solvents has been found desirable, since much better flow and better finish result from such use. For brushing lacquers such high boiling solvents as furfural, diacetone alcohol and glycol diacetate are advisable and the use of such diluents as monochlorbenzol with petroleum hydrocarbons boiling under 160° and chlorinated hydrocarbons is advantageous. Liquids of the blending agent class may in some cases be omitted, but in general, it has been found that they partially replace the true solvent and thus may reduce cost, and in many cases are necessary to properly blend the nitrocellulose with the synthetic resin.

21. *Anhydrous conditions.*—The presence of water in small amounts causes blushing on drying and unless a water-eliminant is present a white film lacking in strength results. It is very desirable that water be eliminated before all the solvent for the nitrocellulose and synthetic resin evaporates. Soluble cotton is generally sold wet with denatured alcohol thirty per cent by weight, and in most cases it is not advisable to dry this. Where low boiling solvents alone are used, it is desirable to employ solvents such as anhydrous ethyl acetate or mixtures of anhydrous ethyl acetate and anhydrous ethyl alcohol. The solvent mixture may be prepared and dried by treatment with calcium carbide, quick lime and the like or by boiling with magnesium powder. Dry nitrocellulose and anhydrous solvents of a highly volatile character reduce the amount of and in some cases render unnecessary the use of, the more costly highly boiling solvents. In any event a lesser amount of the latter is generally required in the winter season when the air is dry. In a humid climate the amount of high boiling solvents may be increased to correspond to the conditions.

22. *Varnishes.*—Lacquers made from nitrocellulose usually have a high proportion of solvents. Varnishes made in accordance with the present invention are preferably produced with the aid of heat treated low-viscosity nitrocellulose in conjunction with a fairly high proportion of synthetic resins in order to raise the total solids to as high a degree as possible. Preferably the total solids should be from 30 to 60 per cent. The addition of dyes soluble in the solvents employed serves to make varnish stains.

23. *Use of a priming coat.*—The surface of the article is preferably primed for which purpose there may be used either an oil-primer such as is customarily used in ordinary painting operations as a first coat, shellac, or the surface may be primed with a composition containing nitrocellulose and a synthetic resin. Such a primer is especially desirable to assist in adhesion. Nitrocellulose coatings of themselves as noted, have low adhesive properties. An oil-primer or a primer of a character substantially dissimilar to that of the outer coatings may be utilized.

As stated, a primer having a nitrocellulose basis containing in most cases a synthetic resin, may be used, the article subsequently being coated with a composition containing nitrocellulose and a synthetic resin compatible therewith. Or if desired, after priming with such a nitrocellulose-synthetic resin composition, the article may be coated with an oil varnish or with layers of oil varnish and nitrocellulose composition. In all cases it is desirable to fill the wood surface before coating, in order to decrease its porosity, this filling being carried out in the usual manner.

When applying the coating to wooden surfaces an oil-primer may be used as above and a second or intermediate coat of some composition which has good sealing properties may be applied over the primer, for example, a shellac mixture may be used. On wood there is a tendency sometimes for the nitrocellulose synthetic resin composition to sink through the primer which causes the surface to become dull. The application of an intermediate sealing coat therefore is desirable under these conditions. It is not absolutely necessary that the primer used be free from nitrocellulose nor that it be simply an oil-primer. In some cases a synthetic resin priming coat may be employed.

24. *Applying nitrocellulose-synthetic resin coating.*—The surface is now in readiness to receive the nitrocellulose synthetic resin coatings. These may be applied with brush or air-gun. After applying a coating the latter may be exposed to a temperature of 50° C. for half an hour. A second coat is applied and similarly dried. The finish then is rubbed with linseed oil or water and rotten stone or pumice stone and if desired may be given a wax finish or polish (carnauba or candelilla wax). If two coats are not adequate an additional number may be supplied.

The following indicate various compositions illustrative of the present invention.

EXAMPLE 1

*Gloss white enamel*

| | Parts by weight |
|---|---|
| Low viscosity nitrocellulose | 12 |
| Castor phthalic glyceride resin | 6 |
| Zinc oxide | 5 |
| Titanox | 5 |
| Dibutyl phthalate | 5 |
| Butyl proprionate | 10 |
| Butyl acetate | 10 |
| Butyl alcohol | 5 |
| Ethyl acetate | 10 |
| Toluol | 30 |
| Total | 100 |

The pigment is best ground well with the dibutyl phthalate in a flat stone or roller mill, the nitrocellulose and resins preferably being put into solution separately, and then the various solutions and pigment base are mixed together, but first being well filtered or centrifuged to cleanse.

The low viscosity nitrocellulose referred to in the foregoing has been heated or chemically treated to lower its viscosity and increase the solubility. The castor phthalate glyceride resin is made by slowly heating a mixture of 47 parts glycerol, 80 parts of phthalic anhydride and 40 parts of castor oil under a reflux condenser with agitation, to a temperature of 290° C., until the acid number has become less than twelve.

EXAMPLE 2

Moving picture film is boiled in water, preferably somewhat alkaline to remove the emulsion and the stripped material is heated to 160° C. for 2 to 5 seconds. This heat-treatment effects a remarkable reduction in viscosity which expressed in a comparative way is indicated by the fact that a solution of the untreated celluloid film had a viscosity represented by 24 minutes while a solution made from the heat-treated product exhibited a viscosity of about 45 seconds.

*Black brushing lacquer*

10 parts low viscosity nitrocellulose
5 parts toluidine tung oil resin
10 parts linseed phthalic glyceride resin
4 parts tricresyl phosphate
4 parts blown rape oil
2 parts spectra black
25 parts furfural
30 parts monochlorbenzol
10 parts ethyl acetate 100 parts The pigment preferably is ground with the softener and subsequently admixed with the other ingredients in much the same manner as previously described. The linseed resin is made in the same manner as given under Example 5.

The toluidine resin is made by heating 30 parts of toluidine and a like amount of tung oil with 6 parts of zinc chloride dissolved in 5 parts of water. The heating is carried out in an open flask, or in a flask with an ordinary condenser to carry off vapors without refluxing action, temperature being raised to 285° C., producing a reddish colored resin. It is advisable to treat this resin to remove the zinc chloride before using in lacquers. This resin has a very useful softening action as well as furnishing a resinous extending constituent.

EXAMPLE 3

Moving picture film is boiled in water preferably somewhat alkaline to remove the emulsion and the stripped material is heated to 160° C., for two to five seconds. This heat treatment effects a remarkable reduction in viscosity which expressed in a comparative way is indicated by the fact that a solution of the untreated celluloid film had a viscosity represented by 24 minutes, while a solution made from the heat-treated product exhibited a viscosity of about 45 seconds.

1 part of nitrocellulose film, rendered low in viscosity by heating a few minutes to 160° C. as described above, 2 parts of resin made from toluidine and tung oil as described previously, 2½ to 3 parts of acetone and ½ to 1 part of furfural, the proportions being by weight, yields a heavy-bodied liquid from which a varnish, paint or stain can be made in accordance with the foregoing.

EXAMPLE 4

Clear wood lacquer 10 parts low viscosity nitrocellulose (made from the above treated film)
20 parts rosin phthalic glyceride
8 parts diethyl phthalate
15 parts butyl acetate
10 parts ethyl acetate
5 parts butyl alcohol
32 parts toluol
—
100 parts by weight.

The resin is made by slowly heating a mixture of 81 parts rosin, 19 parts phthalic anhydride and 21 parts of glyceride to a temperature of 290° C., under a reflux condenser with agitation, or until the acid number is less than twelve.

EXAMPLE 5

Red enamel 10 parts low viscosity nitrocellulose (½ second)
10 parts linseed phthalic glyceride
3 parts toludine red
7 parts dibutyl phthalate
20 parts butyl acetate
10 parts ethyl acetate
10 parts butyl alcohol
30 parts toluol
—
100 parts The pigment is preferably ground first with the plasticizer and then admixed with the other materials as previously described. The resin is made by slowly heating a mixture of 47 parts of glycerol, 80 parts phthalic anhydride and 40 parts of linseed oil fatty acids to a temperature of 230° C., holding at this temperature until an acid number of less than twelve is obtained, mechanical agitation being used throughout.

EXAMPLE 6

Clear wood lacquer

A clear lacquer for use on wood and in which none of the ordinary softeners or platicizers are used may be made as follows:

12 parts low viscosity nitrocellulose
12 parts glycol castor phthalate
24 parts butyl acetate
12 parts ethyl acetate
40 parts toluol
—
100 parts The glycol castor phthalate is a resinous softener and plasticizer and is here used in place of and in greater amount than ordinary softeners. This material is a soft extremely viscous resinous plastic and is made by heating together a mixture of 50 parts ethylene glycol, 80 parts phthalic anhydride and 40 parts castor oil in a suitable container under reflux to a temperature of 230° C. The temperature is held at 230° C., until the acid number of product is less than 12. In this case as in foregoing examples it is strongly advisable to use material of low acidity.

EXAMPLE 7

Cream colored enamel 10 parts low viscosity nitrocellulose (½ second)
5 parts ester gum (rosin ester)
5 parts castor phthalic glyceride resin
5 parts glycol castor phthalate
4 parts dibutyl tartrate
10 parts butyl propionate
10 parts butyl acetate
10 parts ethyl acetate
33 parts toluol
4 parts zinc oxide
4 parts lithopone
⅟₁₆ part lead chromate yellow
⅟₁₆ part raw sienna
—
100 parts The preparation of this lacquer enamel with synthetic resin and plasticizer is substantially the same as previously described.

EXAMPLE 8

Black lacquer enamel 10 parts low viscosity nitrocellulose
5 parts dammar
5 parts rosin phthalic glyceride resin
3 parts lamp black
7 parts diethyl phthalate
15 parts butyl acetate
20 parts ethyl acetate
35 parts toluol
—
100 parts The preparation of this lacquer and rosin phthalic glyceride resin is substantially the same as previously described.

With the foregoing resins the employment of low viscosity nitrocellulose is especially recommended. Due to the condition which gives this type of nitrocellulose its peculiar solubility characteristics, synthetic resins of low acid number may be used to advantage and the employment of typical low viscosity nitrocellulose carries with it the opportunity to avail of a wider range of synthetic resins including cumarone in greater proportion or phenol-formaldehyde (or other aldehyde) resins of scant utility or compatibility with the older types of soluble cotton of high viscosity and easy coagulability.

While several examples of synthetic resins that may be used in this invention are set forth, the examples given are not to be construed as limiting since there may be used various resinous complexes prepared from natural resins such as rosin, Congo or other copal resins, with phthalic acid and glycerol; similar resinous complexes using organic acids other than phthalic such as polybasic aliphatic acids including maleic, fumaric, succinic, malic, citric, tartaric and the like or aromatic acids of a dibasic character as well as benzoic acid, benzoyl or toluyl benzoic acids, naphthenic acids and similar monobasic acids. Resins formed from glycol and other materials containing alcoholic or hydroxyl groups with organic acids may also be used. Resinified phenolphthalein, various formaldehyde resin products such as for example, may be obtained from formaldehyde and cyclohexanone, substituted phenols and other synthetic resins may be used. Ordinary cumerone resin is not recommended at least in any influential proportion. Some of the simple phenol formaldehyde resins are liable to give brittle films.

Resins which are not properly compatible and/or lack the power of adequately "colloiding" with low viscosity nitrocellulose, may be used in some cases in conjunction with a synthetic resin or analogous synthetic solid having the desired property in notable degree. Thus, benzoic phthalic glyceride, possessing excellent "colloiding" properties, may be incorporated with less appropriate resins or solids to ameliorate the difficulties otherwise possibly arising from the use of the latter.

By the term "low viscosity" nitrocellulose as used herein, is meant nitrocellulose which gives solutions of low viscosity as compared with ordinary nitrocellulose, whether such properties have been produced by heat treatment, alkali treatment, etc., applied to nitrocellulose which has already been formed, or by pre-treatment applied to paper or other material, for example, used for nitration, or by any other method.

By the term preservative resin as used herein, it is intended to cover resin of the type resulting from the use of fatty-oils and fatty-oil acids as illustrated above in several of the specific examples, because such resins have been found to exert a peculiar and pronounced preservative effect on nitrocellulose compositions.

Reference is made herein to a companion case Serial No. 684,358 filed June 4, 1924, for disclosures of certain of the compositions set forth in this application.

Having thus set forth my invention, what I claim is:

A wood article carrying a coating composition containing nitrocellulose and a preservative, phthalic glyceride resin.

CARLETON ELLIS.